United States Patent
Himuro et al.

(10) Patent No.: US 10,493,805 B2
(45) Date of Patent: Dec. 3, 2019

(54) PNEUMATIC TIRE

(71) Applicant: BRIDGESTONE CORPORATION, Chuo-ku, Tokyo (JP)

(72) Inventors: Yasuo Himuro, Tachikawa (JP); Dyta Itoi, Setagaya (JP)

(73) Assignee: BRIDGESTONE CORPORATION, Tokyo (JP)

( * ) Notice: Subject to any disclaimer, the term of this patent is extended or adjusted under 35 U.S.C. 154(b) by 1294 days.

(21) Appl. No.: 14/352,490

(22) PCT Filed: Nov. 7, 2012

(86) PCT No.: PCT/JP2012/079440
§ 371 (c)(1),
(2) Date: Apr. 17, 2014

(87) PCT Pub. No.: WO2013/069802
PCT Pub. Date: May 16, 2013

(65) Prior Publication Data
US 2014/0261948 A1 Sep. 18, 2014

(30) Foreign Application Priority Data

Nov. 8, 2011 (JP) ................. 2011-244969
Jan. 11, 2012 (JP) ................. 2012-003145

(51) Int. Cl.
*B60C 13/00* (2006.01)

(52) U.S. Cl.
CPC ..... *B60C 13/001* (2013.01); *Y10T 152/10495* (2015.01)

(58) Field of Classification Search
CPC ....... B60C 13/001; B60C 13/02; B60C 13/04; B60C 2013/045
See application file for complete search history.

(56) References Cited

U.S. PATENT DOCUMENTS

2014/0332135 A1* 11/2014 Himuro ................. B60C 13/001
152/524

FOREIGN PATENT DOCUMENTS

DE    10250787 A1    5/2004
EP    2163406 A1    3/2010
(Continued)

OTHER PUBLICATIONS

Communication dated Oct. 15, 2013, from the Japanese Patent Office in counterpart application No. 2011-244969.
(Continued)

*Primary Examiner* — Adrienne C. Johnstone
(74) *Attorney, Agent, or Firm* — Sughrue Mion, PLLC

(57) ABSTRACT

A pneumatic tire has a pair of bead portions each having a bead core embedded therein, a pair of sidewall portions extending radially outwardly from bead portions, a tread portion extending across both side wall portions, an annular outer decorative portion arranged radially outward and formed by means of printing on a side portion consisting of the sidewall and bead portions, and an annular inner decorative portion arranged radially inward of the outer decorative portion and formed by means of printing on the side portion. The inner decorative portion is provided with decoration in which first inner elements and second inner elements are alternately arrayed in a circumferential direction of the tire. The outer decorative portion is provided with decoration different from the decoration provided on the inner decorative portion.

10 Claims, 6 Drawing Sheets

(56) References Cited

FOREIGN PATENT DOCUMENTS

| JP | 7-164831 | A | | 6/1995 |
|---|---|---|---|---|
| JP | 11-20416 | A | | 1/1999 |
| JP | 2000-118208 | A | | 4/2000 |
| JP | 2000-510191 | A | | 8/2000 |
| JP | 2000255223 | A | | 9/2000 |
| JP | 2002120518 | A | * | 4/2002 |
| JP | 2003-320818 | A | | 11/2003 |
| JP | 2005-153730 | A | | 6/2005 |
| JP | 2006-111242 | A | | 4/2006 |
| JP | 2007-238063 | A | | 9/2007 |
| JP | 2010-036725 | A | | 2/2010 |
| JP | 2010-132239 | A | | 6/2010 |
| JP | 2011-105231 | A | | 6/2011 |
| JP | 2011-148338 | A | | 8/2011 |
| JP | 2012-006531 | A | | 1/2012 |
| WO | WO-2012/032741 | A1 | * | 3/2012 |
| WO | WO-2012/073436 | A1 | * | 6/2012 |
| WO | WO-2013/058412 | A1 | * | 4/2013 |
| WO | WO-2013/069260 | A1 | * | 5/2013 |

OTHER PUBLICATIONS

International Search Report of PCT/JP2012/079440 dated Feb. 5, 2013.
Communication dated Sep. 30, 2015 from the State Intellectual Property Office of the People's Republic of China in counterpart Application No. 201280054994.4.
Communication dated Jul. 14, 2015 from the European Patent Office in counterpart application No. 12847196.8.
Communication dated Aug. 4, 2015, issued by the Japan Patent Office in corresponding Japanese Application No. 2012-003145.

* cited by examiner

PNEUMATIC TIRE

CROSS REFERENCE TO RELATED APPLICATIONS

This is a National Stage of International Application No. PCT/JP2012/079440 filed Nov. 7, 2012, claiming priorities based on Japanese Patent Application Nos. 2011-244969 filed Nov. 8, 2011 and 2012-003145 filed Jan. 11, 2012.

TECHNICAL FIELD

This invention relates to a pneumatic tire provided with an annular decorative portion formed by means of printing on an outer surface of a side portion including a sidewall portion and a bead portion. In particular, the present invention proposes a technique that can enhance the added value by satisfying preferences of users who prefer a tire for an applicable rim having a larger diameter or a tire having a flattened sidewall portion, and that can sufficiently differentiate the tire from other tires in terms of its appearance.

RELATED ART

For the purpose of tricking out a car, widely implemented is a replacement of wheels mounted on the car with ones having a larger diameter, or a so-called inch-up. In addition, users tend to prefer a tire having a flattened side portion rather than a rounded side portion.

SUMMARY OF THE INVENTION

However, when a large diameter tire is mounted on a large diameter rim, a problem that riding comfort of the vehicle is deteriorated by the increase in weight of the wheel or so-called unsprung weight have occurred. Further, when a tire having a flattened side portion is manufactured, it is necessary to increase the gauge thickness of the rubber at around the tire maximum width position. This also increases the weight of the tire, causing a similar problem due to the increase in unsprung weight.

The object of the present invention is to provide a tire which effectively solves a problem in the conventional tire that may be raised when satisfying the preferences of users with respect to the tire mounted on a large diameter rim or the tire having a flattened side portion.

The pneumatic tire according to the present invention comprises a pair of bead portions each having a bead core embedded therein, a pair of sidewall portions extending radially outwardly from bead portions, a tread portion extending across both side wall portions, an annular outer decorative portion arranged radially outward and formed by means of printing on a side portion consisting of the sidewall and bead portions, and an annular inner decorative portion arranged radially inward of the outer decorative portion and formed by means of printing on the side portion, wherein the inner decorative portion is provided with decoration in which first inner elements and second inner elements are alternately arrayed in a circumferential direction of the tire, and the outer decorative portion is provided with decoration different from the decoration provided on the inner decorative portion.

In the present invention, brightness, saturation and hue are defined in the HSV model. In this regard, brightness is an index representing lightness of the color with 100% referring to the lightest color in each hue, and brightness of 0% referring to complete black. Saturation is an index representing intensity of color of the range of 0 to 100% with a range of 0-100%. The larger saturation refers to more intensive color, and the lower saturation refers to more dull color. Hue is an index representing a position of a color on the spectrum if there is color with a range of 0-360 degrees. 0 degree refers to red followed by yellow, green, cyan, blue and magenta in every 60 degrees. A combination of brightness, saturation and hue is referred to as "color" below. In addition, a brightness difference refers to the difference of absolute values of brightness at different locations, and average brightness refers to the average value of the brightness at different locations.

Brightness, saturation and hue are determined by a method in which a spectro-colorimeter (available from, for example, Konica Minolta) is used to measure brightness of the object to be measured such as the outer decorative portion or the inner decorative portion in different system (Lab color space, for example), and then necessary software (Photoshop®, for example) is used to convert the measured brightness into that in the HSV system.

Further, in this specification and claims, dimensions such as the width of the inner decorative portion in the radial direction of the tire are measured under an unloaded state that the tire is assembled to an applicable rim and is inflated with a predetermined pressure unless otherwise specified. The term "applicable rim" as used herein refers to a rim defined by a valid industrial standard in areas where the tire is manufactured or used. For example, it is defined, in Japan, by JATMA (Japan Automobile Tire Manufacturers Association) YEAR BOOK; in Europe, by ETRTO (European Tire and Rim Technical Organization) STANDARDS MANUAL; and in the United States, by TRA (THE TIRE and RIM ASSOCIATION INC.) YEAR BOOK. The term "vicinity of the tire maximum width position" as used herein refers to an area within 20% of the tire section height radially inward and outward of the tire maximum width position under the state that the tire is assembled to the applicable rim and is inflated with a predetermined internal pressure without applying any load to the tire. The term "section height of the tire" as used herein refers to a radial distance from the bead base to the radially outermost point as specified in the above-mentioned standard. The term "predetermined pressure" as used herein refers to a filling air pressure (maximum air pressure) corresponding to the maximum load capacity of the tire defined by the above-mentioned standard such as JATMA in accordance with the tire size, and the term "maximum load capacity" refers to the maximum mass that is allowed to be applied to the tire in the above-mentioned standard. The air as used herein may also be replaced with an inert gas such as nitrogen gas.

Additionally, in the specification and claims, the term "decoration" includes solid colors without any patterns.

The pneumatic tire according to the present invention has the annular outer decorative portion formed by means of printing and disposed in the radially outer region of the side portion including the bead portion and sidewall portions, and the annular inner decorative portion formed by means of printing and disposed radially inside of the outer decorative portion. The inner decorative portion is provided with decoration in which at least the first and second inner elements are alternately arrayed in the circumferential direction of the tire, and the outer decorative portion is provided with decoration different from the decoration provided on the inner decorative portion. Thus, the inner decorative portion appears to be different from the outer decorative portion, and thus the inner decorative portion seems to be a part of the wheel. As a result, the demands of users for a large diameter rim can be satisfied without involving an increase in the weight of the rim. Further, as described above, the inner decorative portion appears as if it were a part of the wheel, so that only the outer decorative part appears to be the side portion of the tire, and at least the outer decorative portion of the side portion, which is actually rounded, appears to be flattened. As a result, the demands of users for a flattened side portion can be satisfied without involving an increase in the weight of the tire.

DESCRIPTION OF EMBODIMENTS

Figure 1:
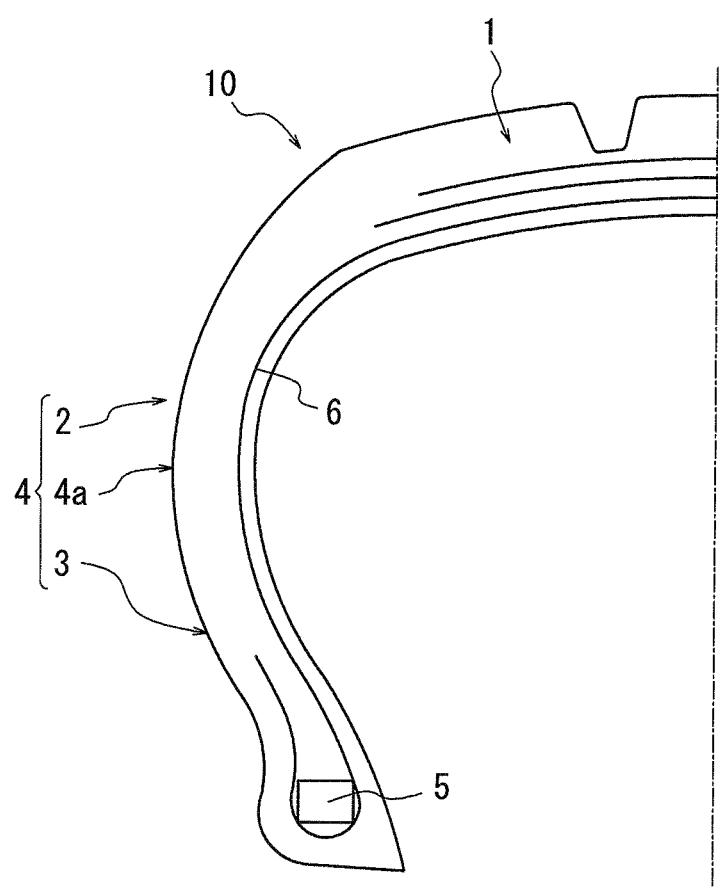
FIG. 1 is a widthwise sectional view showing a half of the tire according to one embodiment of the present invention under a condition that the tire is assembled to an applicable rim and inflated with a given internal pressure with no load being applied. It should be noted that the other half of the tire is symmetric to the half shown in the figure.

Hereinafter, embodiments of the present invention will be discussed with reference to the attached drawings. The following description is illustrative only and the configuration of each component of the tire and the operations and effects are not limited thereto. The pneumatic tire 10 illustrated in FIG. 1 has a tread portion 1, a pair of sidewall portions 2 extending continuously from sides of the tread portion 1 in the radially inward direction of the tire, a pair of bead portions 3 each connected to an inner end of the respective sidewall portion 2 in the radial direction of the tire. Hereinafter, a combination of the sidewall portion 2 and the bead portion 3 is referred to as a side portion 4.

The pneumatic tire 10 includes at least one carcass ply 6 extending between the pair of the bead portions 3. The carcass ply 6, which may have a radial arrangement, extends in a toroidal manner from the tread portion 1 through the pair of sidewall portion 2 to the pair of bead portion 3, and wraps and anchors around a bead core 5 embedded in the bead portion 3 to of at least one sheet is acceptable to extend to three between a pair of bead portions, a radial arrangement, the carcass ply 6, a pair from a tread portion 1 It is locked by extending in a toroidal manner over the bead portions 3 through the sidewall portion 2, to be wrapped and anchored around the bead core 5 embedded in the bead portion 3 to lock carcass ply 6.

Figure 2:
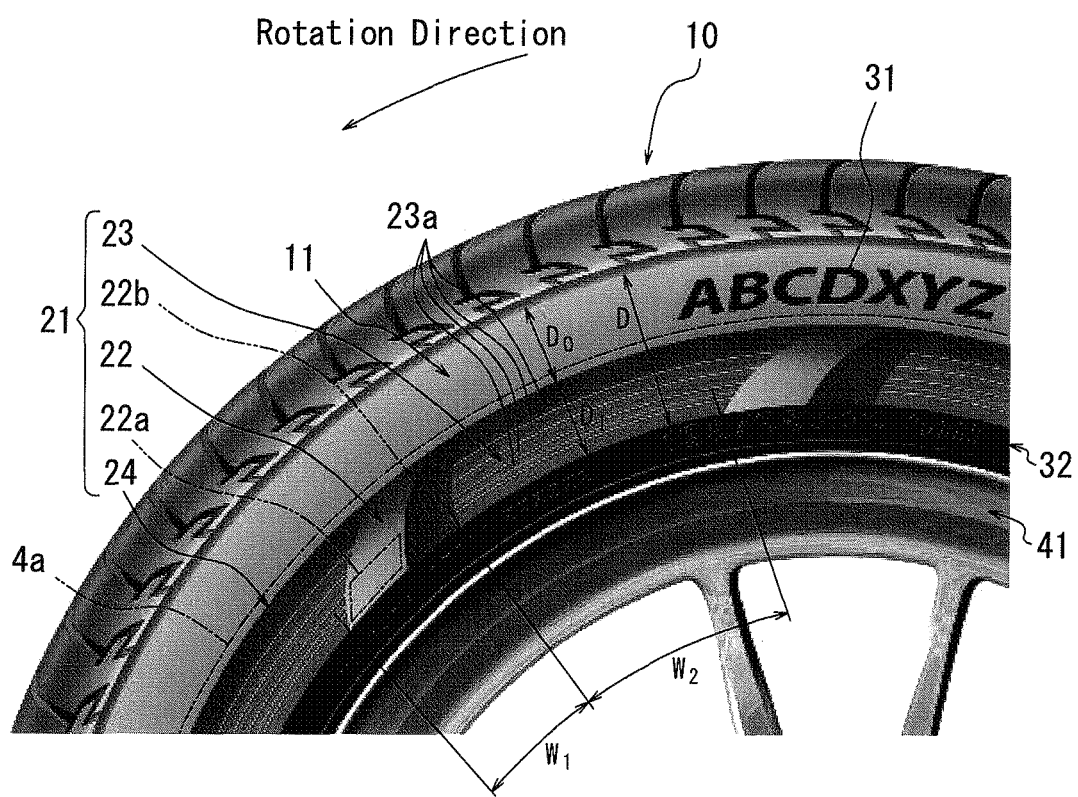
FIG. 2 is a partial side view of the embodiment of the tire shown in FIG. 1 under a condition that the tire is assembled to an applicable rim and inflated with a given internal pressure with no load being applied.

An annular outer decorative portion 11 and an annular inner decorative portion 21 arranged radially inward of the outer decorative portion 11 are formed on the outer surface of the tire side portion 4 of the pneumatic tire 10 shown with an applicable rim 41 in FIG. 2 by means of printing. Conventional bumps and dips indicating the tire size or the like are engraved on a region 32 between the inner decorative portion 21 and the rim line position. It is noted that known printing techniques such as ink jet printing, relief printing, intaglio printing or lithographic printing may be used. The outer decorative portion 11 and the inner decorative portion 21 are adjacent with each other in FIG. 2, but they can also be separated from each other. Also, in the drawing, a mark 31 indicating a company name or the like is formed on the outer decorative portion 11 by means of printing, but the mark 31 may alternatively printed on the inner decorative portion 21.

In order to fully obtain the effect of the invention, each of the annular outer decorative portion 11 and the annular inner decorative portion 21 is preferably formed in a complete circle shape, that is, continues over a full circle along the circumferential direction of the tire. The decorative portions, however, may be formed in a broken circle shape. In the latter case, the number of repetitions of the below-mentions first and second inner elements is counted, assuming that the inner decorative portion 21 continues along the circumferential direction of the tire without any breaks. Similarly, the number of repetitions of the first and second outer elements is counted, assuming that the outer decorative portion is formed continuously. As shown, by printing the outer decorative portion 11, inner decorative portion 21 and the mark 31, it is possible to enhance the decorative properties of the tire. In addition, the printing eliminates any unevenness on the outer surface of the side portion, so that the air resistance during driving decreases to improve the fuel efficiency and that cracks are less likely to occur on the tire side portion to improve the durability.

Meanwhile, bumps and dips are engraved on the engraved area 32 on the inner peripheral side of the inner decorative portion 21, so that it is possible to effectively prevent unintended disappearance of the mark by abrasion or the like. Moreover, when a vehicle equipped with the tire is driven, the engraved area 32 is located widthwise inside the tire maximum width position. Thus, the engraved area 32 is hidden from air (wind pressure) flowing from the front in the vehicle traveling direction and most of the engraved area 32 is not directly exposed to air flowing from the front in the vehicle traveling direction, so that the effect of the stamp on the air resistance is relatively small.

Further, in this embodiment, the outer decorative portion 11 is provided with decorations uniformly formed in the circumferential direction of tire while the inner decorative portion 21 is provided with first inner elements 22 and second inner elements 23 alternately formed in the circumferential direction of the tire. In this way, since the outer decorative portion 11 and the inner decorative portion 21 are decorated in different ways, it is possible to allow the outer decorative portion 11 and the inner decorative portion 21 to differ in appearance, and to allow the inner decorative portion 21 to appear as if it is a part of the wheel 41. As a result, the demands of users for a large diameter rim can be satisfied without involving an increase in the weight of the rim. As in the embodiment shown in FIG. 5 and described later, one of the first inner element 22 and the second inner element 23 (in the embodiment shown in FIG. 5, the second inner element 23) may not be applied with printing or the like and may remain in the background color of the tire. Moreover, in order to allow the inner decorative portion 21 to appear as if it is a part of the wheel, at least a part of the inner decorative portion 21 is preferably colored in the same color as the wheel.

In addition, since the inner decorative portion 21 appears to be a part of the wheel 41, only the outer decorative portion 11 appears to be the side portion of the tire, which allows the outer decorative portion 11 of the rounded side portion 4 to appear flat. As a result, the demands of users for a flattened side portion can be satisfied without involving an increase in the weight of the tire.

From the viewpoint of presenting the inner decorative portion 21 different from the outer decorative portion 11 to appear it as if it were a part of the wheel more realistically, it is preferable to make the decoration applied to the outer decorative portion 11 and the decoration applied to the inner decorative portion 21 visually discontinuous with each other by changing the pattern or color or by dividing them with the later-mentioned intermediate decorative portion.

In the case where the outer decorative portion 11 has different brightness from that of the inner decorative portion 21, the outer decorative portion 11 appears further different from the inner decorative portion 21, which can enhance the effect of making the inner decorative part to appear to be a part of the wheel, and the effect of making visible the outer decorative portion to appear to be flat. On the other hand, brightness and color of the outer decorative portion 11 and the inner decorative section 21 may be the same.

Figure 3:
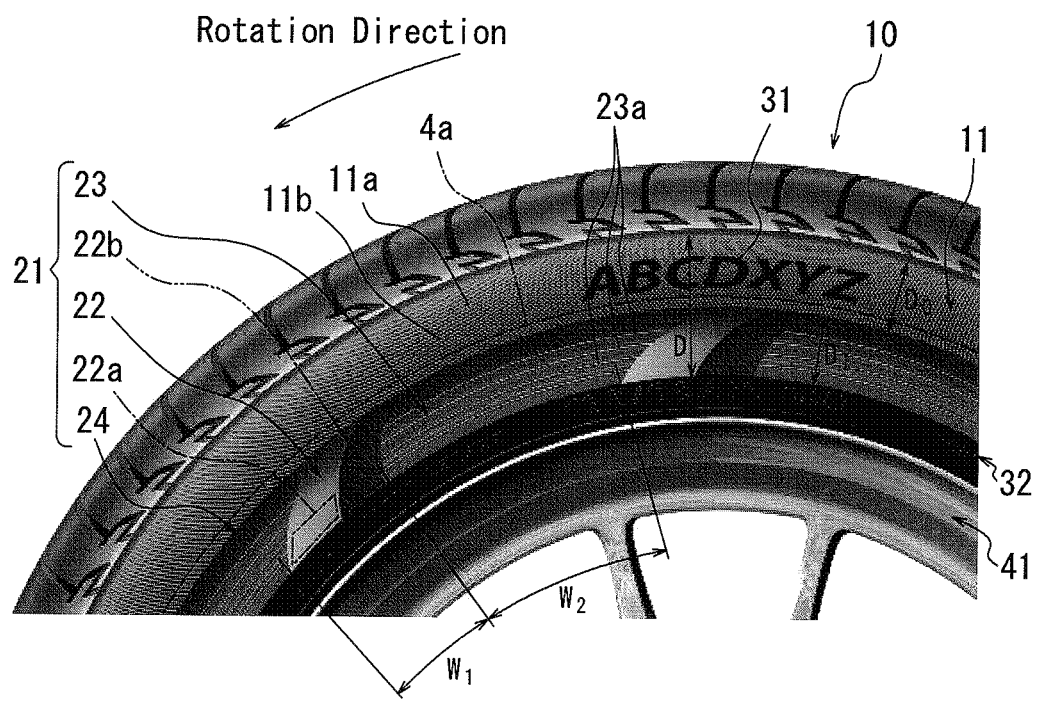
FIG. 3 is a side view of another embodiment of the present invention similar to FIG. 2.

As illustrated in FIG. 2, when the decoration of the outer decorative portion 11 continues in the circumferential direction of the tire, or, as illustrated in FIG. 3, when the outer decorative portion 11 is provided with the first outer elements 11a and the second outer elements 11b which are alternately and intermittently repeated like stripes or the like in the circumferential direction of the tire, the effect of making the outer decorative portion to appear to be flat can be enhanced by increasing the difference in texture between the outer decorative portion and the inner decorative portion having discontinuous decoration in the tire circumferential direction of the tire.

Where the widths of the outer decorative portion 11 and the inner decorative portion 21 in the radial direction of the tire are $D_O$ and $D_I$, respectively, and D is the sum of $D_O$ and $D_I$, the ratio $D_O/D$ is within a range of 0.3-0.6. In this case, the outer decorative portion 11 appearing to be the flattened side portion 4 and the inner decorative portion 21 appearing to be a part of the wheel 41 are visually balanced, so that the decorative effects of the outer decorative portion 11 and the inner decorative portion 21 can be concurrently achieved. In other words, if the ratio $D_O/D$ is less than 0.3, the width of the outer decorative portion in the radial direction of the tire is too small, resulting that the outer decorative portion does not appear to be the flattened side portion and hardly exerts the effect of improving the appearance quality. On the other hand, if the ration $D_O/D$ is more than 0.6, the width of the inner decorative portion in the radial direction of the tire is too small, resulting that the effect of making the rim diameter of the inner decorative portion to appear to be larger is hardly exerted. When the boundary between the outer decorative portion 11 and the inner decorative portion 21 is placed in the vicinity of the tire maximum width position 4a, it can make the tire to be appeared to have a flat side wall portion and be mounted on a large diameter rim without giving any odd senses to a viewer. Thus, the preferences of users can be further satisfied.

As shown in FIG. 2, when the maximum deviation in brightness of the outer decorative portion 11 in the circumferential and radial directions of the tire is not more than 5%, the brightness of the outer decorative portion 11 does not change in both of the circumferential and radial directions of the tire. This allows the outer decorative portion 11 to be observed as a flat smooth surface, so that the effect of making the outer decorative portion 11 to appear to be flattened. On the other hand, when the maximum deviation in brightness of the outer decorative portion is greater than 5%, the decorative portion appears to have a shadow in the circumferential or radial direction of the tire. This gives the outer decorative portion a stereoscopic effect, resulting that the outer decorative portion appears to be not flattened.

Further, as shown in FIG. 3, the first outer element 11a and the second outer element 11b circumstantially alternated in the outer decorative portion 11 may have brightness in a range of 10-90%, and the difference in brightness between the first outer element 11a and the second outer element 11b may be in a range of 50-80%. The first outer elements 11a and the second outer elements 11b may be arranged so as to repeat alternately 200-1500 times except for the area where the mark 31 is formed. In this embodiment, the outer decorative portion 11 appears to be provided with serrations, ridges or the like formed by a molding process. In addition, it is possible to make a circular-shaped uneven portion due to the existence of the turn-up end of the carcass ply 6 in the tire side portion less noticeable. Accordingly, the appearance quality of the tire side portion 4 can be improved. The first other elements 11a and the second outer elements 11b may be formed radially around the tire rotation axis, or alternatively, the first outer elements 11a and the second outer elements 11b, or the boundaries thereof may also be formed in a curved or polygonal line or the like.

Figure 4:
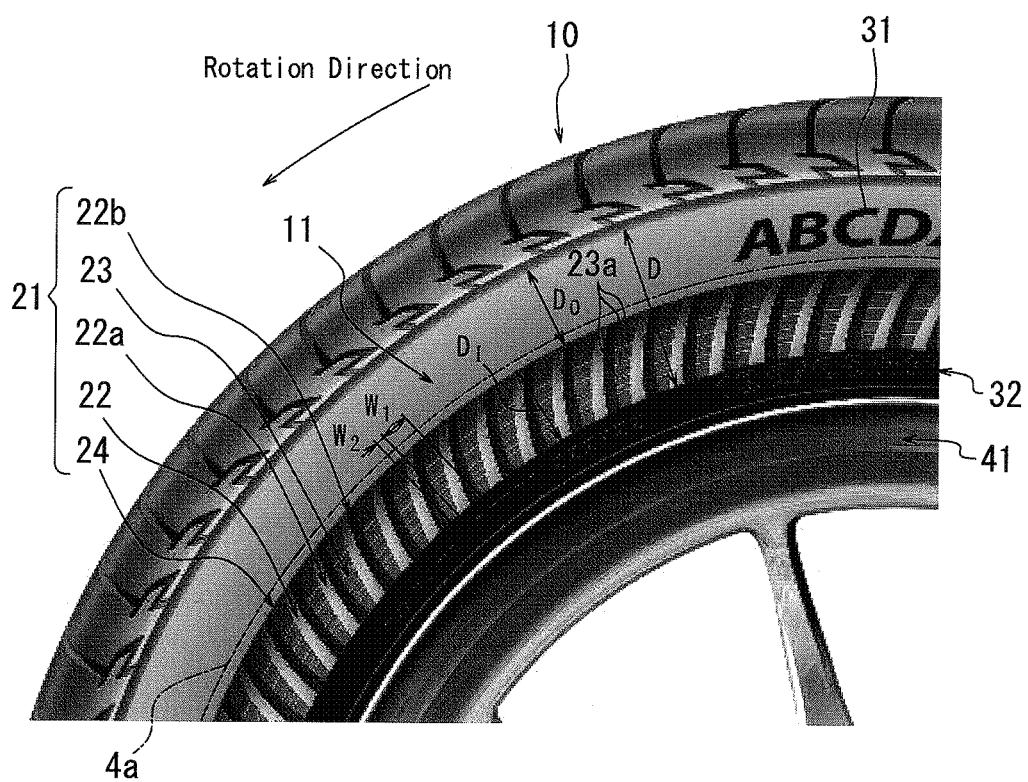
FIG. 4 is a side view of yet another embodiment of the present invention similar to FIG. 2.

In the case where the first inner elements 22 and the second inner elements 23 of the inner decorative portion 21 repeat alternately 3 to 100 times in the circumferential direction of the tire, wheel spokes appear to extend into the first inner elements. This allows the tire to appear to be mounted on the large diameter rim. For example, in FIGS. 2 and 3, the number of repetitions of both elements is nine or less which is close to the number of spokes of the currently available rims, and the width $W_2$ of the circular second inner element is larger than the width $W_1$ of the circular first inner element in the circumferential direction of the tire. In other words, the number of repetitions of the first and second inner elements is less than three or more than 100, a wheel having such number of spokes does not exist practically, and thus a visual effect of causing an illusion of the first inner element 22 to appear the spoke of the wheel could not be obtained. Further, when the number of repetitions is more than 100, the space between the first inner elements is too small, and thus the first inner elements do not appear to be the spokes. This reduces the effect of allowing the rim to appear to have a large diameter. In particular, when the width of the circular first inner element in the circumferential direction of the tire is 20 mm or more, the above-mentioned effects can be further enhanced. It is noted that, when a user purchases tires and rims separately, the number and shape of spokes of the wheel do not always agree with those of the decoration of the first inner element of the tire. However, so long as they are similar, even if not exactly agree, it is possible to exert the effect of allowing the inner decorative portion to appear to a part of wheel. In another embodiment as shown in FIG. 4, the width $W_1$ of the circular first inner element 22 in the circumferential direction of the tire is approximately equal to the width $W_2$ of the circular second inner element 23 in the circumferential direction of the tire, and the number of repetitions of both elements 22, 23 is 30-100, which is different from currently available wheels. Even in this case, the inner decorative portion 21 appears to be a part of the wheel 41 in its entirety, which allows the tire to appear to be mounted on a large diameter rim.

As mentioned above, where the first outer elements 11a and the second outer elements 11b, which have smaller widths in the circumferential direction of the tire than those of the first inner elements 22 and the second inner elements 23, are arranged alternately and repeatedly in the circumferential direction of the tire to form a decoration, the number of repetitions of the first outer elements 11a and the second outer elements 11b of the outer decorative portion 11 is larger than the number of repetitions of the first inner elements 22 and the second inner elements 23 of the inner decorative portion 21. This causes an illusion effect that gives a viewer different senses of unevenness between the outer decorative portion 11 and the inner decorative portion 21, which increases of the difference in texture between the outer decorative portion 11 and the inner decorative portion 21 to enhance the effect of allowing the outer decorative portion 11 to appear to be flattened.

In FIG. 2, when the difference between the average brightness of a steric element 22a which is a part of the region of the inner decorative portion 21 between the inner edge position of the first inner element 22 in the radial direction of the tire and the position spaced outside of the inner edge position in the radial direction of the tire by 30% of the radial width $D_I$ of the inner decorative portion 21, and the average brightness of the decoration continued in the outer decorative portion 11 is in a range of 0-15%, as well as at least one edge (in the figure, the right edge in the circumferential direction) of the region of the first inner element 22 adjacent to the second inner element 23 of the inner decorative portion 21 is provided with a shadow element 22b having brightness in a range of 10-30%, a shadow appears on the first inner element 22, which makes a pseudo steric impression on the first inner element 22. This allows the first inner element 22 to appear to be a spoke of the wheel, and thus can enhance the effect of allowing the rim to be bigger. In the case where the mark 31 is formed in the outer decorative portion 11 or the inner decorative portion 21, the above-mentioned average brightness refers to the average brightness of the portion except for the mark 31. The same is applied to the below-mentioned average brightness of the first outer element 11a and the second outer element 11b.

Similarly, in FIG. 3, when the difference between the average brightness of the steric element 22a which is a part of the region of the inner decorative portion 21 between the inner edge position of the first inner element 22 in the radial direction of the tire and the position spaced outside of the inner edge position in the radial direction of the tire by 30% of the radial width $D_I$ of the inner decorative portion 21, and the larger of the average brightness of the first outer element 11a and the second outer element 11b is in a range of 0-15%, as well as at least one edge of region of the first inner element 22 of the inner decorative portion 21 adjacent to the second inner element 23 is provided with a shadow element 22b having brightness in a range of 10-30%, the effect of making the rim appear to be bigger can be enhanced.

Further, when the first inner element 22 of the inner decorative potion 21 is inclined to either side of the tire circumferential direction with respect to the radial direction of the tire, the inner decorative portion 21 can be visually dynamic in the rotational direction of the tire and can be clearly differentiated from the decoration of the outer decorative portion 11. Therefore, it is possible for the outer decorative portion 11 to enhance the effect of making the side portion 4 appear to be flattened and the effect of making the rim appear to have a larger diameter. The inclination may be curved in the direction opposite to the rotational direction of the tire as shown in FIGS. 2-4 so that the contour of the first inner element 22 has a streamline shape, or the contour may be a straight line or a polygonal line.

As shown in FIGS. 2-4, an annular gradation region 24 which has brightness increasing toward inside of the radial direction of the tire and has the maximum deviation in brightness of 30% or more may be provided in an area of the inner decorative portion 21 between 3 mm and 10 mm inside of the outer edge position in the radial direction of the tire, or from the outer edge portion to a position spaced therefrom by the distance that is 50% or less than the radial width $D_I$ of the inner decorative portion 21. In this case, since a portion with lower brightness generally appears to be recessed and a portion with higher brightness appears to be raised, the gradation region 24 appears to be recessed as compared to the outer decorative portion 11. This can enhance the effects of making the outer decorative portion 11 appear to be flattened and of making the inner decorative portion appear to be a part of the large diameter rim by differentiating the textures of the outer and inner decorative portions to allow the inner decorative portion 21 other than the shadow of the first inner element 22 to appear to be raised. With regard to the formation of the gradation, it is possible to alter brightness in any manner. For example, brightness may linearly increase toward the inside in the radial direction of the tire. The same applies to the gradation region provided in the below-described tire of another embodiment.

The second inner element 23 of the inner decorative portion 21 may be provided with a colored portion 23a having brightness of 50% or more and saturation of 15% or more. In this case, by imparting saturation of at least a certain degree to the second inner element 23, it is possible to have a significant difference in the texture between the outer decorative portion 11 and the inner decorative portion 21, which can enhance the effect of the outer decorative portion 11 making the side plane 4 appear to be flattened. Further, in the case where saturation of the outer decorative portion 11 is 5% or less, the outer decorative portion 11 is sufficiently close to the achromatic color to allow the inner decorative portion 21 to have higher saturation. Therefore, the texture of the inner decorative portion 21 and the outer decorative portion 11 are significantly different, and the effect of making the outer decorative portion 11 appears to be flattened can be further enhanced.

Furthermore, in the case where the colored portion 23a has a plurality of line portions forming the decoration extending in the circumferential direction of the tire as shown in FIGS. 2-4, the effect of making the second inner element 23 appear to be raised is suppressed as compared to the case where the colored portion 23a is entirely colored, so that the effect of making the inner decorative portion 21 appear to be a part of the rim can be further enhanced. Although it is not clearly shown in FIGS. 2-4, the colored portion 23a has line portions with brightness of 90%, saturation of 100% and hue of 200 degrees (greenish yellow), and line portions with brightness of 55%, saturation of 85% and hue of 130 degrees (blue), which are arranged alternately and repeatedly from inside of the radial direction of the tire. In this embodiment, the lines curvedly extend in the circumferential direction, but it may have a waved shape.

When the colored portion 23a has brightness of 50-80% and saturation of 50-100%, or brightness of 75-100% and saturation of 15-80%, and the difference in hue between the colored portion 23a and the vehicle to be equipped with the tire is, for example, 0-60 degrees, the decoration property is enhanced due to the homogeneous hue distribution over the tire and the vehicle. The outer decorative portion 11 may have hue different from that of the colored portion 23a and the vehicle to emphasize the outer decorative portion 11, so that the effect of the outer decorative portion 11 making the side portion 4 appear to be flattened can be further enhanced. That is, when brightness or saturation is lower than the above-mentioned ranges, the colored portion demonstrates less decorative effect. On the other hand, when brightness or saturation is higher than the above-mentioned ranges, the outer decorative portion is less noticeable to hardly exert the effect of the outer decorative portion making the side portion appear to be flattened.

Next, a tire 110 according to another embodiment of the present invention is discussed with reference to FIG. 5. The tire 110 also has a decorative potion 131 consisting of an annular outer decorative portion 111 which is arranged in the outer region of the side portion 4 in the radial direction of the tire, is formed by means of printing, and extends substantially continuously in the circumferential direction of the tire, and an annular inner decorative portion 121 which is arranged inside of the outer decorative portion 110 in the radial direction of the tire, and is formed by means of printing. The inner decorative portion 121 consists of first inner elements 122 applied with printing and second inner elements 123 having no decoration such as painting and baring the tire surface. The first and second inner elements are arranged alternately and repeatedly, and the first inner elements 122 are spaced from each other in the circumferential direction of the tire. It is noted that the second inner element 123 may be applied with printing so as to have color and brightness different from those of the first inner element 122. In this embodiment, the outer decorative portion 111 and the inner decorative portion 121 adjacent the outer decorative portion 111 are divided by an annular intermediate decorative portion 126 having brightness smaller than that of the outer decorative portion 111 and the inner decorative portion 121. This allows the intermediate decorative portion 126 to appear to be a shadow of the outer decorative portion 111, so that the decorative portion 131 can appear stereoscopic to create an appearance resembling the real wheel.

According to the tire 110 having such a configuration, it is possible to provide a viewer with visual effects that the outer decorative portion 111 appears similar to the flange portion of the wheel, and that a plurality of first inner elements 122 arranged inside of the outer decorative portion 111 in the radial direction of the tire appears similar to the spoke of the wheel. This can create an illusion for the viewer to consider the decorative portion 131 as a part of the wheel, and thus can create an appearance similar to the inch-up without changing the tire size.

The decorative portion 131 of the tire 110 according to this embodiment further has a connecting decorative portion 125 connecting the first inner elements 122 adjacent in the circumferential direction of the tire. By forming such a connecting decorative portion 125, it is possible to highlight the first inner element 122 to create an illusion for the viewer to consider that a large diameter wheel is mounted. It is noted that the connecting decorative portion 125 may be colored in the same manner as the outer decorative portion 111. It is also possible that the adjacent first inner elements 122 are not completely separated from each other in the circumferential direction of the tire, and that the connecting decorative portions 125 are formed between the first inner elements 122. As shown in FIG. 5, a portion 125a of the connecting decorative portion 125 adjacent to the first inner element 122 in the radial direction of the tire is preferably recessed from the rest of the connecting decorative portion 125 in the radial direction of the tire from the view point of presenting the outer decorative portion 111 and the first inner element 122 stereographically to create an illusion for the viewer to consider that a large diameter wheel is equipped.

From the view point of enhancing the visual effect of creating an illusion for the viewer to consider the outer decorative portion 111 as a part of the flange portion, the outer decorative portion 111 is preferably disposed in the vicinity of the tire maximum width position and has brightness of 30% or more at the central portion in the radial direction of the tire.

Also, the outer decorative potion 111 preferably has brightness of 20% or less at the outer edge portion in the radial direction of the tire from the viewpoints of creating an illusion for the viewer to consider the outer edge portion as a shadow of the flange of the wheel to give a stereoscopic effect and creating an appearance resembling the real wheel.

From the view point of creating an appearance of the outer decorative portion 111 resembling the real wheel, the outer edge portion of the outer decorative portion 111 preferably has brightness smaller than that of the central portion of the outer decorative portion 111.

Also, from the view point of enlarging the width of the outer decorative portion 111 other than the outer edge portion in the radial direction of the tire that has high brightness and visibility to improve the visibility of the outer decorative portion 111, the width of the outer edge portion of the outer decorative portion 111 in the radial direction of the tire is preferably smaller than the width of the rest of the outer decorative portion 111 in the radial direction of the tire.

In this case, the outer decorative portion 111 preferably has saturation of 5% or more from the viewpoint of enhancing the visibility of the outer decorative portion 111 serving as the pseudo wheel portion.

In addition, since the designs of the outer decorative portion 111 and the inner decorative portion 121 are different from the real wheel, the outer decorative portion 111 and the inner decorative portion 121 are preferably formed so as to appear to be independent from the outer edge portion of the real wheel. The decorative portion 131 can naturally appear to be independent from the wheel by gradually changing brightness of the inner decorative portion 121 toward inside of the radial direction of the tire. In particular, it is preferable that the gradation region is provided on the first inner element, and/or the difference in brightness between both ends of the gradation region in the radial direction of the tire is 40% or more. By so doing, it is possible to further enhance the above-mentioned effects. As shown in the Example disclosed below, the second inner elements 123 all have the same constant brightness, and each of the first inner elements 122 has a gradation region where brightness gradually changes toward an inner edge of the first inner element 122 in the radial direction of the tire, the smallest brightness in each first inner element 122 being larger than that of the second inner element 123.

Since the design of the decorative portion 131 is different from the real wheel, the decorative portion 131 is preferably formed so as to appear to be independent from the outer edge portion of the real wheel. When the inner edge portion of the inner decorative portion 121 in the radial direction of the tire has brightness of 20% or less, the decorative portion 131 can naturally appear to be independent from the wheel. Also, the width of the inner edge portion of the first inner element 122 in the radial direction of the tire is preferably smaller than the width of the rest of the first inner element 122 in the radial direction of the tire from the view point of enlarging the width of the first inner element 122 other than the inner edge portion in the radial direction of the tire that has high brightness and visibility to improve the visibility of the first inner element 122. The inner edge portion of the inner decorative portion 121 in the radial direction of the tire is formed by an extension of the second inner elements 123 in a circumferential direction of the tire.

Further, at least one of the peripheral edge portions of the first inner element 122 preferably has brightness of 60-20% from the view point of allowing the peripheral edge portion of the first inner element 122 to appear to be a shadow to give a stereoscopic effect and create an appearance more resembling the real wheel.

The maximum width of the outer decorative portion 111 in the radial direction of tire is preferably smaller than the maximum width of the first inner element 122 in the radial direction of tire from the view point of balancing the sizes of the outer decorative portion 111 extending in the circumferential direction of the tire and the first inner element spaced in the circumferential direction of the tire to eliminate the odd feeling of the viewer.

Both of the smallest brightness of the outer decorative portion 111 and the smallest brightness of the first inner element 122 are preferably 50-100% from the view point of differentiating brightness of the outer decorative portion 111 and the first inner element 122 from brightness of the ground color of the sidewall rubber which is generally black to improve the visibility of the outer decorative portion 111 and the first inner element 122.

Figure 5:
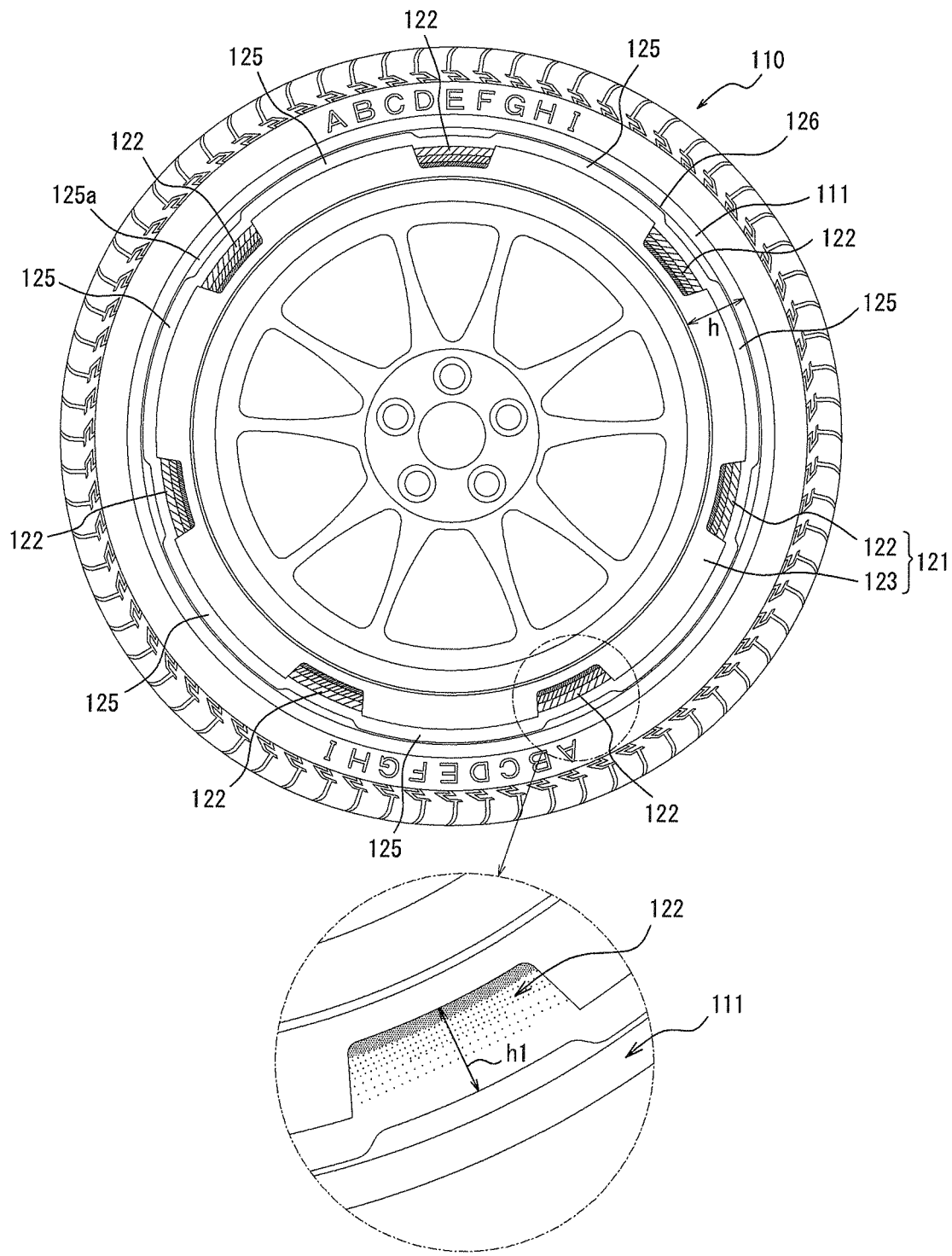
FIG. 5 is a side view of yet another embodiment of the present invention similar to FIG. 2.

As shown in FIG. 5, assuming that the width of the first inner element 122 in the radial direction of the tire is h1 and the width of the decorative portion 131 in the radial direction of the tire is h under a condition that the tire 110 is assembled to an applicable rim and is inflated with a given internal pressure with no load applied, the ratio h1/h is preferably 30-90% from the view point of ensuring the visual effect of creating an illusion for the viewer to consider the decorative portion 131 as a part of the wheel. In the case, where the decorative portion 131 includes a connecting decorative portion 125, the above-mentioned h1 represents the width of the region combining the first inner element 122 and the connecting decorative portion 125 in the radial direction of the tire.

Assuming that the width from the tread end to the rim line position in the radial direction of the tire is represented by S, the ratio h/S is preferably 20-60% from the view point of securing the width of the outer decorative portion 111 and the inner decorative portion 121 in the radial direction of the tire to secure the visibility while the outer edge of the outer decorative portion 111 id displaced around the tire maximum width position in the radial direction of the tire to agree the tire maximum width position and the position appearing to be the rim flange, which enables a visual effect of creating an illusion for the viewer to consider that a large diameter wheel is equipped without giving any odd feeling. That is, when the ratio h/S is less than 20%, the widths of the outer decorative potion 111 and the inner decorative portion 121 in the radial direction of the tire cannot be secured and thus the visibility is unlikely to be secured. When the ratio h/S exceeds 60%, the tire maximum width position and the position appearing to be a rim flange do not agree with each other, which is likely to give the viewer an odd feeling. In the case where the outer decorative portion 111 and the inner decorative portion 121 are not disposed in an area within 15 mm outside of the above-mentioned rim line position, the ratio h/S is preferably 40% or less.

Further, the decorative portion 131 is preferably not disposed in an area of the side portion at least from the tread end to 10-15 mm outside of the rim line position. Indication such as tire size defined in the standards such as JATMA and ETRTO is required to be provided around the rim line, and each standard designates the position where the indication is placed, which is often inside of the maximum width position. Thus, a space for the indication needs to be secured in the area about 10-15 mm outside of the rim line. Therefore, from the view point of enhancing the visibility of the indication, the decorative potion 131 is preferably not disposed in the area 10-15 mm outside of the rim line portion.

Figure 6:
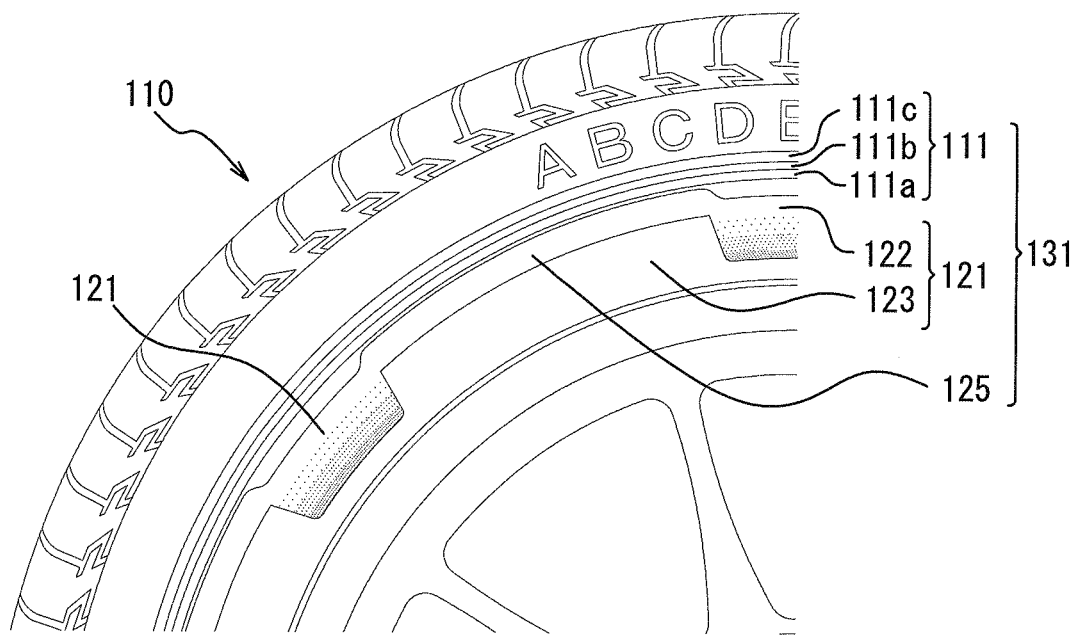
FIG. 6 is a side view of yet another embodiment of the present invention similar to FIG. 2.

FIG. 6 shows yet another embodiment of the present invention. The same symbols are assigned to elements similar to those described in the embodiment tire shown in FIG. 5, and detailed description thereof is omitted.

The tire of this embodiment is different from the tire shown in FIG. 5 in that the outer decorative portion 111 includes a plural of annular decorative bands having mutually different hues and extending along the circumferential direction of the tire. In this example, the outer decorative potion 111 has three annular decorative bands 111a, 111b and 111c which have different hues.

In this way, by configuring the outer decorative portion 111 from the three annular decorative band 111a, 111b and 111c, it is possible to create a pseudo-flange portion which is regarded as a tricolor flag using, for example, three kinds of hues. This enables to elaborate the decoration according to a demand from the customers, for example, a combination of red, white and blue for French cars and a combination of red, white and green for Italian cars.

In the embodiment described above, the present invention is applied to the both sides of the tire. The present invention, however, may be applied to only a half of the tire, in particular, to the half facing to the outside when assembled on a vehicle.

Example 1

Hereinafter, Example 1 to 7 according to the present invention and Comparative Example 1 and 2 were experimentally manufactured. Each tire was mounted on a vehicle body and visually inspected to evaluate a rim diameter and a flatness of the side portion observed by a viewer. Specifically, 10 viewers observed each tire, and a survey was conducted in the form of questionnaire asking if the rim appears to be larger and if the side portion appears to be flattened as compared to a tire having no outer and inner decorative portions. The results were shown in Table 3. It should be noted that the results of the appearance of the largeness of the rim diameter and the flatness of the side portion are indicated by indices with the results of Comparative Example 1 being set to 100. The greater the index is, the larger and flatter the viewer observed the rim diameter and the side portion, respectively.

Examples 1-7 and Comparative Example 1 and 2 had the tire size of 195/65R15, the side portion of 75 mm in width in the radial direction of the tire. A space of 15 mm was disposed from the rim line position in the radial direction of the tire, and then an inner decorative portion and an outer decorative portion each having a width $D_I$ and $D_O$, respectively, in the radial direction of the tire were adjacently arranged in the side portion in this order toward the outside in the radial direction of the tire. The distance from the boundary between the outer and inner decorative portions to the tire maximum width position in the radial direction of the tire is represented by $\Delta D$. $\Delta D$ with a positive value means that the inner decorative portion is disposed beyond the tire maximum width position, and $\Delta D$ with a negative value means that the outer decorative portion is disposed beyond the tire maximum width position.

Further, as shown in FIG. 2, Examples 1-7 each was provided with a decoration having brightness of 80% and saturation of 0% on the outer decorative potion. The first inner element of the inner decorative portion was provided with a decoration having saturation of 0% and brightness decreasing from 80% to 10% linearly from inside to outside in the radial direction of the tire, as shown in FIG. 2. On the other hand, Comparative Example 1 was provided with a decoration having brightness of 80% and saturation of 0% on the outer decorative portion, and decoration having brightness of 80% and saturation of 0% on the inner decorative portion. Comparative Example 2 was provided with a decoration having brightness of 80% and saturation of 0% on the outer decorative portion, a decoration having brightness of 10% and saturation of 0% on the region of the inner decorative portion within 10 mm from the outer edge in the radial direction of the tire, and a decoration having brightness of 70% and saturation of 0% on the rest of the inner decorative portion.

As shown in FIG. 2, in the second inner element of the inner decorative potion of Examples 1-6 and in the region of the inner decorative portion of Comparative Example 2 spaced 10 mm or more from the outer edge in the radial direction of the tire, a line portion having brightness of 90%, saturation of 100% and hue of 200 degrees (greenish yellow) and a line portion having brightness of 55%, saturation of 85% and hue of 130 degrees (blue) were alternately and repeatedly formed on the ground color having brightness of 80% and saturation of 0% from inside in the radial direction of the tire. The width of the line portions in the width direction of the tire was 1 mm, and the space between the line portions in the width direction of the tire was 1.5 mm.

Example 6 was formed with, as shown in FIG. 3, a serrated decoration consisting of the first outer elements having brightness of 90% and saturation of 0% and the second outer elements having brightness of 10% and saturation of 0% repeated 100 times on the outer decorative portion.

Example 2

A decorative portion 131 consisting of an outer decorative portion 111 and an inner decorative portion 121 was formed on the side portion surface of the tire, and a test was conducted to confirm if an illusion effect of inch-up could be obtained. The detail is described below.

Example 1 had a tire size of 195/65R15 and was provided with a decoration portion 131 as shown in FIG. 5 on the side portion surface. Example 1 had an outer decorative potion 111 having a width (distance in the radial direction of the tire) of 6 mm and brightness of 80%. The width of the outer edge portion of the outer decorative portion 11 in the radial direction of the tire had a width of 1 mm and brightness of 10%. The first inner element 122 of the inner decorative portion 121 had a width of 6 mm and brightness gradually decreasing from 80% toward the inner edge in the radial direction of the tire. The inner edge portion of the first inner element 122 had a width of 1 mm in the radial direction of the tire and brightness of 20% (i.e., the difference in brightness was 60%). The second inner element 123 of the inner decorative portion 121 was not applied with printing and bared the ground color of the tire. The second inner element 123 had a width of 6 mm and brightness of 10%. The connecting decorative portion 125 connected regions within 3 mm from the outer edge of the first inner element 122 in the radial direction of the tire with each other in the circumferential direction, and had brightness of 80%. The intermediate decorative portion 126 had brightness of 30%.

Example 2 had the same configuration as that of Example 1 except that the center portion of the outer decorative portion 111 in the radial direction of the tire had brightness of 20%.

Example 3 had the same configuration as that of Example 1 except that the outer edge portion of the outer decorative portion 111 in the radial direction of the tire had brightness of 80%.

TABLE 1

|  | Ex. 1 | Ex. 2 | Ex. 3 | Ex. 4 | Ex. 5 | Ex. 6 | Ex. 7 | Comp. Ex. 1 | Comp. Ex. 2 |
|---|---|---|---|---|---|---|---|---|---|
| Number of repeats of inner decorative potion | 9 | 4 | 100 | 9 | 9 | 9 | 9 | — | — |
| $D_O/D$ | 0.5 | 0.5 | 0.5 | 0.4 | 0.6 | 0.5 | 0.5 | 0.5 | 0.5 |
| ΔD (mm) | 0 | 0 | 0 | 6 | −6 | 0 | 0 | 0 | 0 |
| Number of repeats of first and second decorative portions | — | — | — | — | — | 100 | — | — | — |
| Gradation  Inner decorative portion | Exist | Exist | Exist | Exist | Exist | Exist | Exist | Exist | — |
| Colored portion (line portion) | Exist | Exist | Exist | Exist | Exist | Exist | — | — | Exist |
| Rim diameter (sensory evaluation) | 150 | 130 | 140 | 160 | 140 | 145 | 120 | 100 | 105 |
| Flatness of side portion (sensory evaluation) | 120 | 120 | 120 | 130 | 110 | 110 | 110 | 100 | 110 |

The results show that Example tires provided with outer and inner decorative portions on the side portion and first and second inner elements on the inner decorative portion appear to have a larger rim diameter and a more flattened side portion as compared to Comparative Examples. It is also shown that the outer decorative portion provided with a serrated printing portion or a gradation, and the inner decorative portion provided with a colored portion make the rim diameter and the side portion appear to be even larger and even flatter, respectively.

Example 4 had the first inner element 122 in which brightness gradually decreasing from 80% to 40% (i.e., the difference in brightness was 40%) toward inside in the radial direction of the tire.

Example 5 had the outer decorative portion 111 in which brightness gradually decreasing from 80% to 60% (i.e., the difference in brightness was 20%) toward inside in the radial direction of the tire.

Example 6 had the same configuration as that of Example 1 except that the outer decorative portion 111 and the intermediate decorative portion 126 adjacent to the outer decorative portion 111 had brightness of 80%.

Example 7 had the same configuration as that of Example 1 except that the peripheral edge portion of the first inner element 122 in the radial direction of the tire had brightness of 0%.

Example 8 had the same configuration as that of Example 1 except that the peripheral edge portion of the first inner element 122 in the radial direction of the tire had brightness of 20%.

Example 9 had the same configuration as that of Example 1 except that the outer decorative potion 18 had saturation of 2%.

Example 10 was provided with the decorative portion 131 as shown in FIG. 6 on the surface of the side portion. In Example 10, the width of the outer decorative potion 111 was 6 mm, and the outer decorative portion 111 consisted of an annular decorative band 111a situated radially inside (green: hue of 120 degrees, brightness of 100% and saturation of 100%), an annular decorative band 11b situated radially outside (red: hue of 0 degree, brightness of 100% and saturation of 100%) and an intermediate annular decorative band (white: brightness of 100% and saturation of 0%). The outer edge portion of the outer decorative portion 111 in the radial direction of the tire had brightness of 10%. The rest of the configurations were the same as those of Example 1.

Each of the test tires was mounted on a rim having the size of 6J×15, and the maximum internal pressure (240 kPa) compatible with the JATMA standard was applied, and then 30 viewers visually inspected. The results were shown in Table 2. In the results in the table, the mark "C" means that less than 10 viewers observed the illusion effect of inch-up, the mark "B" means that 10 or more and less than 20 viewers observed the illusion effect, and the mark "A" means that 20 or more viewers observed the illusion effect.

TABLE 2

| | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| Illusion Effect | A | B | C | B | C | C | B | B | A | A |

As can be seen from the results in Table 2, the decorative portion applied with the present invention can exert an illusion effect of inch-up.

REFERENCE SYMBOLS

1: Tread portion
2: Sidewall portion
3: Bead portion
4: Side portion
4a: Tire maximum width position
5: Bead core
6: Carcass ply
10, 110: tire
11, 111: Outer decorative portion
11a: First outer element
11b: Second outer element
111a-111c: Annular decorative band
21, 121: Inner decorative portion
22, 122: First inner element
22a: Steric element
22b: Shadow element
23, 123: Second inner element
23a: Colored portion (line portion)
31: Mark
32: Engraved area
41: Wheel
51: Vehicle
125: Connecting decorative portion
131: Decorative portion
$D_O$: Width of the outer decorative portion in the radial direction of the tire
$D_I$: Width of the inner decorative portion in the radial direction of the tire
D: Sum of $D_O$ and $D_I$
$W_1$: Width of the first inner element in the circumferential direction of the tire
$W_2$: Width of the second inner element in the circumferential direction of the tire
h1: Width of the first inner element in the radial direction of the tire
h: Width of the decorative portion in the radial direction of the tire

The invention claimed is:

1. A pneumatic tire comprising a pair of bead portions each having a bead core embedded therein, a pair of sidewall portions extending radially outwardly from the bead portions to form a pair of side portions each including one of the sidewall portions and its associated bead portion, a tread portion extending across both sidewall portions, a carcass ply extending from the tread portion through the pair of sidewall portions to the pair of bead portions and wrapping around the respective bead core to form a pair of turn-up ends, each turn-up end making a circular-shaped uneven portion in the respective tire side portion, one of the side portions having printed thereon an annular outer decorative portion arranged radially outward and an annular inner decorative portion arranged radially inward of the outer decorative portion, the printed annular inner decorative portion covering the circular-shaped uneven portion, wherein
the inner decorative portion is provided with decoration in which first inner elements and second inner elements are alternately arrayed in a circumferential direction of the tire, and
the outer decorative portion is provided with decoration different from the decoration provided on the inner decorative portion,
the second inner elements all have the same constant brightness, and each of the first inner elements has a gradation region wherein brightness gradually changes toward an inner edge of the first inner element in the radial direction of the tire, the smallest brightness in each first inner element being larger than that of the second inner elements, and
the inner edge portion of the inner decorative portion in the radial direction of the tire is formed by an extension of the second inner elements in a circumferential direction of the tire.

2. The pneumatic tire according to claim 1, wherein the decoration applied to the outer decorative portion and the decoration applied to the inner decorative portion are discontinuous with each other.

3. The pneumatic tire according to claim 1, wherein an annular outer edge portion of the annular outer decorative portion has brightness smaller than that of an annular center portion of the annular outer decorative portion.

4. The pneumatic tire according to claim 1, wherein an annular outer edge portion of the annular outer decorative portion has a width smaller than that of the rest of the outer decorative portion in the radial direction of the tire.

5. The pneumatic tire according to claim 1, wherein the inner decorative portion is provided with an annular connecting decorative portion connecting the first inner elements adjacent in the circumferential direction of the tire.

6. The pneumatic tire according to claim 5, wherein a portion of the annular connecting decorative portion adjacent to each of the first inner elements in the radial direction of the tire is recessed inwardly from the rest of the annular connecting decorative portion in the radial direction of the tire.

7. The pneumatic tire according to claim 1, wherein the gradation region of each of the first inner elements has a deviation in brightness of 40% or more.

8. The pneumatic tire according to claim 1, wherein in each first inner element the inner edge portion in the radial direction of the tire has brightness 20% to 60% and the inner edge portion in the radial direction of the tire has a width smaller than that of the rest of the first inner element in the radial direction of the tire.

9. The pneumatic tire according to claim 1, wherein the annular inner decorative portion and the annular outer decorative portion are divided by an annular intermediate decorative portion having brightness smaller than that of the annular inner decorative portion and annular outer decorative portion.

10. The pneumatic tire according to claim 1, wherein the outer and inner decorative portions have mutually different brightness.

* * * * *